United States Patent
Luo et al.

(10) Patent No.: US 11,773,714 B1
(45) Date of Patent: Oct. 3, 2023

(54) EXPERIMENTAL METHOD FOR DETERMINING FLOW PATTERNS IN VERTICAL WELLBORE OF GAS WELLS AT HIGH-PRESSURE CONDITIONS

(71) Applicant: Southwest Petroleum University, Chengdu (CN)

(72) Inventors: Chengcheng Luo, Chengdu (CN); Ning Wu, Chengdu (CN); Yonghui Liu, Chengdu (CN); Qiang Wang, Chengdu (CN); Changqing Ye, Chengdu (CN); Fengjing Sun, Chengdu (CN)

(73) Assignee: Southwest Petroleum University, Chengdu (CN)

( * ) Notice: Subject to any disclaimer, the term of this patent is extended or adjusted under 35 U.S.C. 154(b) by 0 days.

(21) Appl. No.: 18/307,617

(22) Filed: Apr. 26, 2023

(30) Foreign Application Priority Data

Aug. 8, 2022 (CN) .......................... 202210941318.4

(51) Int. Cl.
*E21B 47/06* (2012.01)
*G01F 1/74* (2006.01)
*E21B 47/07* (2012.01)
*E21B 47/047* (2012.01)

(52) U.S. Cl.
CPC ............ *E21B 47/07* (2020.05); *E21B 47/047* (2020.05)

(58) Field of Classification Search
CPC .............. G01F 1/74; E21B 47/06; G01N 1/38
See application file for complete search history.

(56) References Cited

U.S. PATENT DOCUMENTS

| 5,251,488 A * | 10/1993 | Haberman ............... G01N 9/10 73/861.04 |
| 5,327,970 A | 7/1994 | McQueen et al. |
| 2009/0301726 A1 | 12/2009 | Coronado |
| 2013/0317791 A1 | 11/2013 | Danielson |
| 2016/0305205 A1* | 10/2016 | Li ........................... E21B 34/00 |
| 2018/0010944 A1* | 1/2018 | Xie .......................... G01N 1/38 |
| 2018/0347508 A1 | 12/2018 | Lee |
| 2020/0190950 A1 | 6/2020 | Bailey |

(Continued)

FOREIGN PATENT DOCUMENTS

| AU | 2015268632 A1 | 1/2016 |
| CN | 108894772 A | 11/2018 |
| CN | 113919240 A | 1/2022 |

(Continued)

*Primary Examiner* — Kipp C Wallace
(74) *Attorney, Agent, or Firm* — Nitin Kaushik

(57) ABSTRACT

An experimental method for determining flow patterns in vertical wellbore of gas wells at high-pressure conditions, which falls within the technical field of deliquification for gas reservoirs. The method comprises: collecting target block parameters; Developing physical simulation experiment to measure the liquid holdup of vertical wellbore; Constructing similarity dimension number to characterize gas density and change with liquid holdup to represent flow similarity of different gas velocities at different pressures; Utilizing equal liquid holdup to represent flow similarity, fitting similarity dimension coefficient, normalizing flow under different pressure conditions to same similarity dimension number, realizing coincidence of change cure of liquid holdup of normal pressure and medium pressure with similarity dimension number.

2 Claims, 2 Drawing Sheets

(56) References Cited

U.S. PATENT DOCUMENTS

2021/0270647 A1* 9/2021 Xie .................. G01F 15/066
2022/0298892 A1* 9/2022 Li .................... E21B 43/35

FOREIGN PATENT DOCUMENTS

| CN | 114323553 A | 4/2022 |
| CN | 114817836 A | 7/2022 |
| CN | 114818535 A | 7/2022 |
| GB | 2534618 A | 8/2016 |

* cited by examiner

EXPERIMENTAL METHOD FOR DETERMINING FLOW PATTERNS IN VERTICAL WELLBORE OF GAS WELLS AT HIGH-PRESSURE CONDITIONS

CROSS-REFERENCE TO RELATED AT

The application claims priority to Chinese patent application No. 202210941318.4, filed on Aug. 8, 2022, the entire contents of which are incorporated herein by reference.

TECHNICAL FIELD

The present disclosure is in the field of deliquification for gas reservoirs, and more particularly relates to an experimental method for determining flow patterns in vertical gas wells at high-pressure conditions.

BACKGROUND

Thee production of gas wells is always accompanied by liquid produced. With the decrease in gas reservoirs energy, gas wells production will gradually decrease. The liquid is difficult to be carried out by gas and leads to complex interface in the gas-liquid two-phase flow. Under different superficial gas velocities, gas-liquid two-phase flow will present different flow patterns. Due to temperature and pressure varying greatly along several kilometers of gas well depth, different flow patterns will appear in the wellbore. Accurate prediction of flow patterns in gas wells is the theoretical basis of dynamic analysis and deliquification technologies design.

The prediction of gas-liquid two-phase flow patterns is still based on experimental simulation so far, mainly through observing or measuring the flow characteristics by measurement and control techniques, and some empirical charts or transition equations were created. Although there are some theoretical analyses and corresponding semi-empirical correlations in terms of gas-liquid two-phase flow patterns, the current research trends are also toward mechanical models and numerical simulation development. Due to the extreme complexity of two-phase flow distribution, the flow patterns and their transitions are closely related to the flow characteristics, the performance of the mechanism model is not satisfactory. The reason is the extremely simplified interfacial structure and complex two-phase flow parameter correlations in the modeling process, the mechanism model prediction accuracy is usually lower than the empirical model in the practical application process.

Limited by the experimental range, the use of empirical prediction methods will not meet the requirements and the prediction error is large. But the application range can be widened by using a dimensionless criterion coordinate axis based on the similarity principle. There are many flow parameters affecting the gas-liquid two-phase flow patterns, such as liquid and gas velocities and pressure, and different researchers consider different parameters affecting the flow patterns. Despite the large overlap of experimental data, the available results show that there is no unique standard to characterize the gas-liquid two-phase flow patterns. Generally speaking, it is almost impossible to completely demonstrate gas-liquid two-phase flow pattern changes by using a simple two-dimensional coordinate system. Therefore, it is necessary to consider the most important influencing factors for the analysis of the various regulation and establish a reasonable dimensionless criterion in the experimental simulation of specific two-phase flow patterns, so as to expand its application range accurately.

The existing visualized experimental facility and instrumentation cannot meet high-pressure conditions which are in the range of tens to hundreds of megapascals, i.e., it is not possible to restore simulated gas wellbore conditions to measure gas-liquid two-phase flow patterns at high-pressure conditions.

For high-pressure gas wells and medium-low pressure physical simulated experiment, the largest difference is the gas density changes due to pressure changes, so considering the effect of gas density on the flow patterns is one of the most critical factors in the study of gas-liquid two-phase flow patterns in vertical gas wells.

However, the Duns & Ros model, which is widely used in the petroleum field, developed dimensionless numbers that do not take into account the effect of gas density. Only a few researchers consider the effect of gas density and present relevant analysis, and there has yet to be a report on the study of the effect of gas phase density on flow patterns transition to be reported in the relevant published literature. However, the degree of influence of gas phase density on flow may vary at different superficial gas velocities in vertical gas wells, and it is challenging to demonstrate similar flow patterns in all flow patterns using the existing single criterion number.

Therefore, the present disclosure aims at the problem that the variation law of the flow patterns in the high-pressure vertical gas wells is different from that in the medium-low pressure experimental simulated conditions based on the visual test pipe and instrumentation for gas-liquid two-phase flow patterns, an experimental method for determining a flow pattern in the vertical gas wells at high-pressure conditions is proposed. This method uses the equal liquid holdups to characterize the similarity of flow patterns. Then the similarity numbers are fitted under different experimental pressure conditions to predict the flow patterns in high-pressure vertical gas wells.

SUMMARY

Due to different change laws of the flow patterns of high-pressure gas wells and medium-low pressure experimental simulated conditions, the purpose of the present disclosure is to solve the problem that the flow patterns in vertical wellbore of gas wells cannot meet the prediction accuracy at high-pressure conditions, and to propose an experimental method for determining flow patterns in vertical wellbore at high-pressure conditions, so as to provide a theoretical basis for the optimization design of dynamic analysis and deliquification.

The present disclosure proposes an experimental method for determining flow patterns in vertical wellbore of gas wells at high-pressure conditions, which is specifically implemented in a gas-liquid two-phase pipe flow experimental system capable of withstanding medium pressure. The experimental facility is mainly composed of gas supply system, liquid supply system, pressure control system, a visual test section, and a data acquisition system. Considering the effect of gas density on the flow patterns, gas-liquid two-phase pipe flow experiments at low and medium pressure are carried out to observe the flow patterns at different gas-liquid flow rates. The published literature shows that the smooth curve of the liquid holdup varies along with the gas flow rates, and the liquid holdup being the same under different pressure conditions means the flow patterns are the same, thus the gas-liquid two-phase flow patterns are observed and the liquid holdup of the wellbore is measured. As the density of the gas phase increases with the increase of pressure, the changing curvature of the liquid holdup curve in medium-pressure conditions is steeper than the changing curvature of the liquid holdup of the low-pressure condition. In addition, the drag force of the gas phase on the liquid phase increases with increasing pressure, i.e., the corresponding gas flow rates decrease at the equal liquid holdup in medium-pressure conditions. To this end, a dimensional number $\rho_{SG} v^{n(1-\alpha H_L)}$ is constructed considering the gas density and the liquid holdup, which is used to characterize the flow similarity for different gas flow rates (liquid holdup) at different pressures (gas density). Based on the principle that the liquid holdups are equal when the flows are similar, the flow coefficients n and α are fitted at different pressure conditions, and the two-phase flow under different pressures is normalized using the same similarity criterion so that the curves of the liquid holdup at medium-low pressure varying along with the similarity criterion coincide, and then the flow patterns in the vertical wellbore of gas wells at high-pressure conditions are predicted.

The gas and liquid supply systems provide gas and liquid separately, and the gas-liquid flow rates is set by the measurement and control system during the experimental process.

The pressure control system is provided with a gas-liquid separator at the outlet of the experimental pipeline, which is connected to the outlet pressure control valve. The range of opening degree size in the outlet pressure control valve is adjusted using the pressure control system such that the gas-liquid two-phase flow experiments are performed in the gas-liquid two-phase flow experiment under different pressure conditions.

The experimental pipe section is a polycarbonate transparent pipe, it can help perform experiments at low-medium pressure and observe the flow patterns of the gas-liquid two-phase in the vertical wellbore. A pneumatic valve is far from 100 times the pipe diameter of the gas-liquid inlet. The liquid holdup of the wellbore is measured when the flow in the experimental pipe is stable, and a pressure gauge measures the pressure in the pipe section.

The measurement and control system is able to collect, display and store the flow parameters of the experimental process in real-time, including superficial gas velocities, superficial liquid velocities, and wellbore pressure, and adjust the outlet pressure control valve and electric valve according to the set up flow parameters.

In order to achieve the above-mentioned object, an experimental method for determining flow patterns in the vertical wellbore of gas wells at high-pressure conditions according to the present disclosure comprises the following steps:

step 1: Dynamic production parameters of gas wells are collected in an interesting area, pressure, temperature, gas production, and liquid production of the high-pressure gas wells, which are consistent with the field, calculating gas density, superficial gas velocity, and superficial liquid velocity in vertical wellbore of gas wells, and the corresponding calculation formula being as follows:

(1.1) calculation formula of gas density ($\rho_{SG}$) under different pressure conditions:

$$\rho_{SG} = \frac{pM}{ZRT}, \text{ where } \rho_{SG} \text{ is gas density, } (kg/m^3);$$

P is pressure, (MPa); M is relative molecular mass of natural gas, (g/mol); T is temperature, (K); R is ideal gas constant. (0.008314 atm·m³/(kmol·K)); and Z is deviation factor, dimensionless;

(1.2) calculation formula for superficial gas velocity ($v_{SG}$) in vertical wellbore of gas wells:

$$v_{SG} = \frac{Q_{SC}\rho_{SC}}{\rho_{SG}^A},$$

where $Q_{SC}$ is gas production, (m³/d); $\rho_{SC}$ is atmospheric gas density, (kg/m³); and A is a cross-sectional area of pipe. (m²);

(1.3) calculation formula for superficial liquid velocity ($v_{SL}$) in the gas well wellbore:

$$v_{SL} = \frac{Q_{SL}}{A},$$

where $Q_{SL}$ is liquid production of the gas well, (m³/d);

step 2: determining the superficial liquid velocity of the experiment based on the superficial liquid velocity of an interesting gas well, and selecting a specific pressure value ranging between the low pressure and a maximum pressure condition that can be reached in the experimental facility (medium-pressure condition $p_m$), performing a gas-liquid two-phase pipe flow experiment, observing flow patterns and measuring the liquid holdup of the wellbore, specifically comprising:

(2.1) calibrating a manometer and a flowmeter to ensure that the test equipment is in good condition including a pneumatic valve, an outlet pressure control valve and an electric valve;

(2.2) the outlet pressure control valve being fully opened, ensuring that the experiment is carried out under low pressure ($p_{sc}$) conditions;

(2.3) adjusting a gas-liquid flow rate to ensure that a target superficial gas-liquid flow rate is being reached in the wellbore, observing the gas-liquid two-phase flow patterns after the flow is stable, then closing the pneumatic valve, and the liquid holdup $H_L$ of the wellbore measured using a liquid level height, dimensionless; the calculation formula being $$H_L = \frac{H_{mea}}{H_{total}},$$

where $H_{mea}$ is a distance from the pneumatic valve to a liquid level, (m); and $H_{total}$ is a distance from the pneumatic valve to an outlet of the pipeline, (m);

(2.4) gradually increasing the superficial gas velocity, a step length Δv being set as 1 m/s, repeating (2.3), recording the liquid holdup of the wellbore at different gas flow rates under the low-pressure conditions, and plotting a curve of the liquid holdup varying along with the superficial gas velocity;

(2.5) adjusting the gas-liquid flow rate to ensure that the superficial gas-liquid flow rate in the wellbore is reached at the set up conditions, adjusting the outlet pressure control valve until a specific pressure value ($P_m$) is achieved in the experimental facility within the maximum pressure condition, namely, the medium pressure condition, repeating steps (2.4) and (2.5), obtaining the liquid holdup of the wellbore at different gas flow rates under the pressure condition, and then plotting the variation curve of the liquid holdup along with the superficial gas velocity;

step 3: different values of n and α were assumed, according to the experimental test results of liquid holdup varying along with gas flow rate under low-medium pressure conditions, plotting the coordinate curve of liquid holdup varying along with the similarity criterion $\rho_{SG} v^{n(1-31\ \alpha H_L)}$, n and α representing fining coefficients; obtaining the n and α values which characterize the flow similarity when the variation curves of the liquid holdup of the wellbore varying along with the similarity criterion coinciding under the conditions of low pressure ($P_{SC}$) and medium pressure ($p_m$);

step 4: the gas density and the superficial gas velocity of the high-pressure gas well are calculated in step S1, using the similarity criterion to calculate a corresponding superficial gas velocity under low-pressure conditions and again through gas-liquid two-phase experiments, observing a corresponding flow pattern, namely, a flow patient at the high-pressure gas well.

The present disclosure has the following advantageous effects.

The experimental method for determining flow patterns in the vertical wellbore of gas wells at high-pressure conditions, according to the present disclosure takes full account of the main factors affecting the flow patterns, which is extended to the prediction of the flow patterns of the high-pressure gas well by using the similarity criterion between the flow patterns of low pressure and a medium pressure experiments. Therefore, this method is simple in calculation and applicable, which provides a theoretical basis for dynamic analysis and deliquification technologies design.

1-air compressor, 2-gas storage tank, 3-pintle valve, 4-gas flowmeter, 5-water storage tank, 6-high-pressure plunger pump, 7-throttle valve, 8-liquid flowmeter, 9-test pipe section, 10-pneumatic valve, 11-gas-liquid separator, 12-liquid pressure control valve, 13-gas pressure control valve, 14-gas blowout valve, 15-pressure gauge, 16-measurement and control computer,

DETAILED DESCRIPTION OF THE EMBODIMENTS

In order that the objects, calculations and advantages of the present disclosure will become easier to understand, a more particular description of the disclosure will be rendered by reference to the appended drawings. It should be understood that the particular embodiments described herein are illustrative only and are not limited to the present disclosure.

Figure 1:
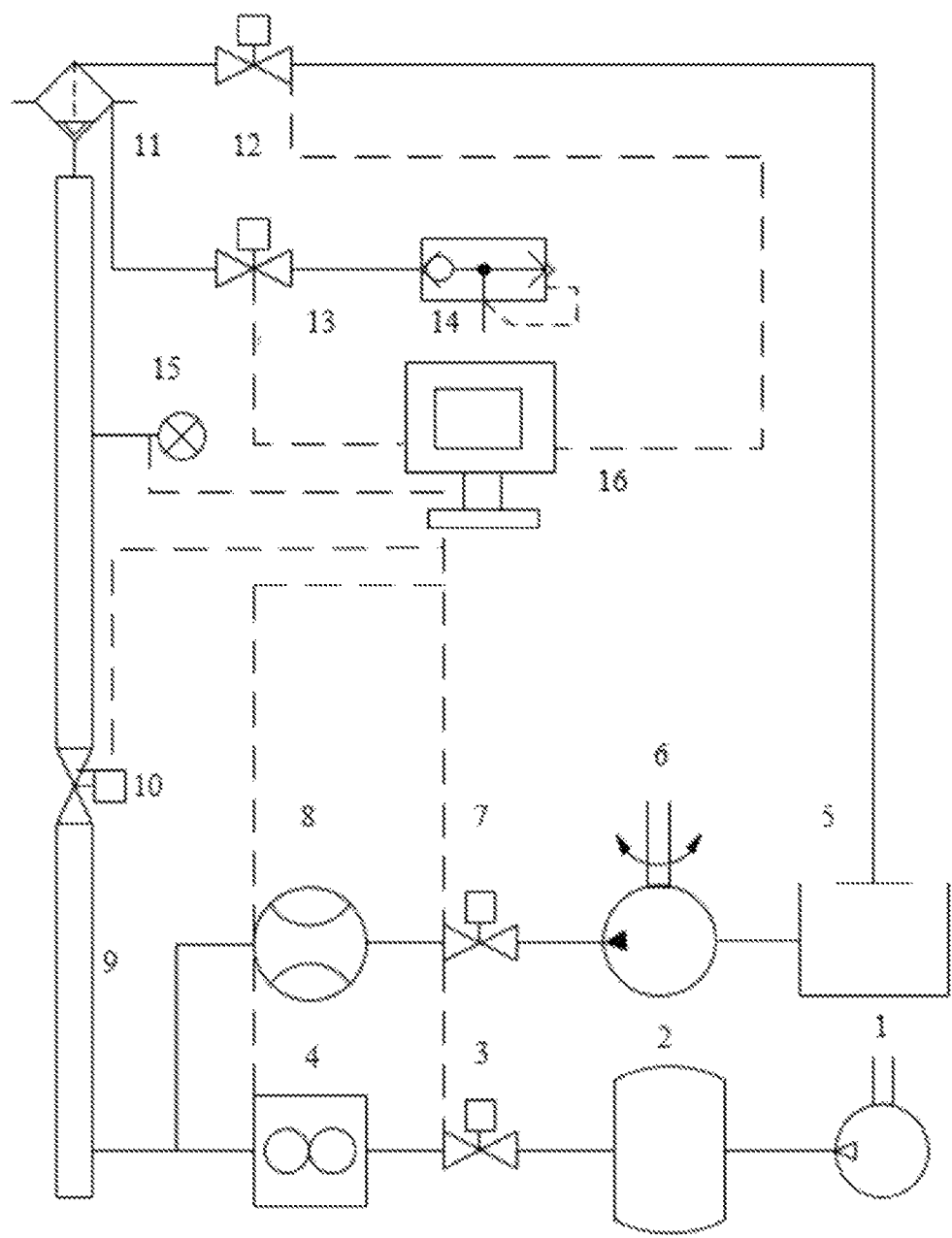
FIG. 1 is a schematic diagram of a gas-liquid two-phase facility according to an experimental method for determining flow patterns in vertical wellbore of gas wells at high-pressure conditions in the present disclosure.
Figure 2:
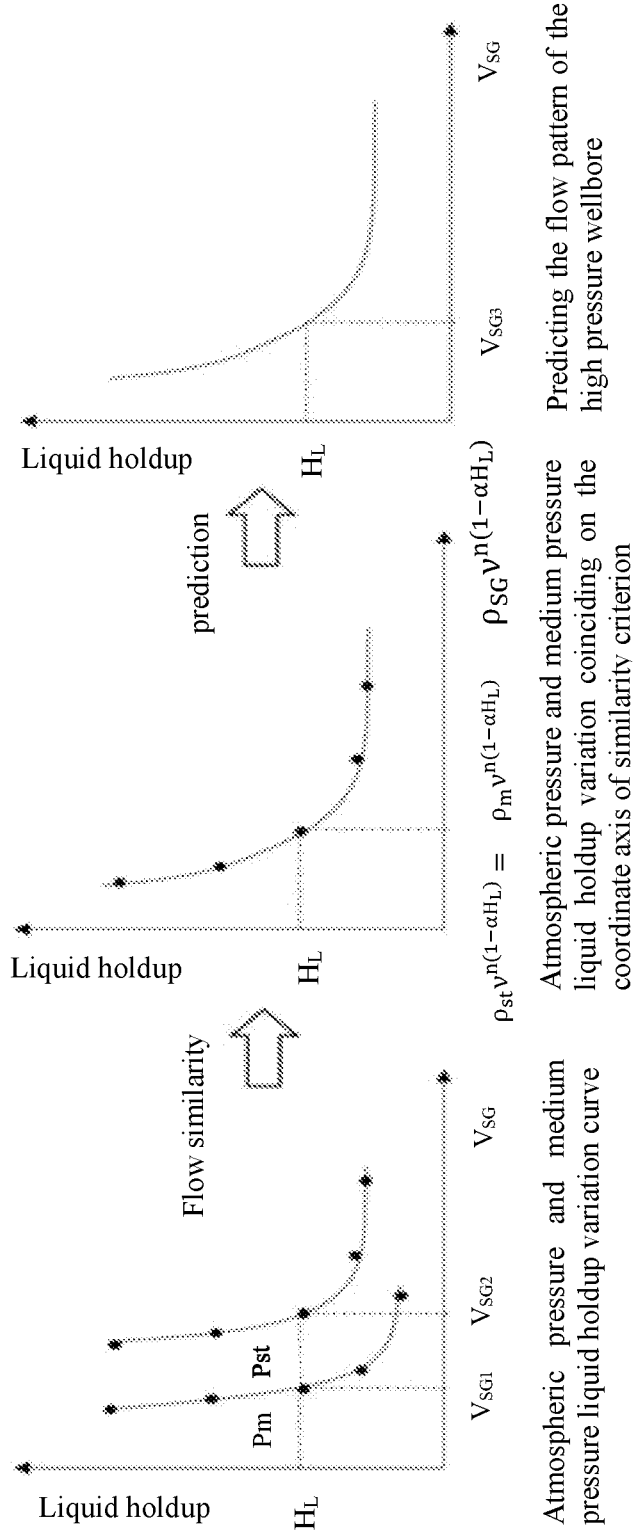
FIG. 2 is a schematic diagram of the implementation of the experimental method for determining flow patterns in vertical wellbore of gas wells at high-pressure conditions.

As shown in FIG. 1, it is a schematic diagram of a gas-liquid two-phase pipe flow facility, which is an experimental method for determining flow patterns in vertical wellbore of gas wells at high-pressure conditions according to the present disclosure. The observation of gas-liquid two-phase flow patterns and the measurement of wellbore liquid holdup under different pressure conditions during the experiment progress. FIG. 2 is a flowchart of an implementation of the experimental method for determining flow patterns in vertical wellbore of gas wells at high-pressure conditions, illustrating a specific calculation process of the experimental procedure for determining a flow pattern in vertical wellbore of gas well under high-pressure conditions.

The gas flow rate, liquid flow rate and wellbore pressure required for the experiment are set up in advance by the measurement and control system during the experimental process. The gas is pumped into a gas storage tank 2 via an air compressor 1, regulated by a pintle valve 3, and metered by a gas flow meter 4 into a test pipe section 9. The liquid is pre-stored in a water storage tank 5, pressurized by a high-pressure plunger pump 6 and controlled by a throttle valve 7, and flows into a test pipe section 9 after being metered by a liquid flow meter 8. The gas and liquid flow into a gas-liquid separator 11 after passing through the experimental pipe section, the separated gas phase is Vented after passing through the gas pressure control valve 13, and the separated liquid phase flows into the liquid storage tank after passing through the liquid pressure control valve 12 and is recycled. The pressure in the wellbore is monitored by acquiring the data of a pressure gauge 15 through the measurement and control system, and the outlet pressure control valve is continuously adjusted by the measurement and control computer 16, so that the pressure in the wellbore is stabilized at the setting value. The flow patterns in the wellbore are observed and noted, then the pneumatic valve 10 is closed, the wellbore holdup is measured and the data is recorded, and the experimental section is completed.

The variation of wellbore liquid holding with gas flow rates was statistically analyzed under the equivalent fluid flow rates at low and medium pressure conditions in the calculation. According to the similarity criterion of gas-liquid two-phase flow, the variation regulation of a liquid holdup curve at low pressure and medium pressure conditions is drawn on the coordinate curve of similarity criterion by using dimensional groups $\rho_{SG} v^{n(1-\alpha H_L)}$, and the n and α values are determined by continuously adjusting so that the two liquid holdup curves coincide. Then based on the range of wellbore pressure in the vertical gas well, the gas density and liquid holdup variation range of the high-pressure gas well are calculated, and the liquid holdup range of the high-pressure gas well is determined through the relationship curve between liquid holdup and similarity criterion, and the flow patterns of the high-pressure vertical gas wells can be determined by conducting gas-liquid two-phase flow experiments with the identical liquid holdup at low pressure and observing the flow patterns.

What is claimed is:

1. a method for determining flow patterns of a wellbore of a vertical gas well under high pressure conditions using an experimental apparatus at a facility, comprising the steps of:

S1: collecting dynamic production parameters of gas wells in a study area, specifically pressure, temperature, gas production and liquid production parameters of the gas wells, S11: calculating gas density Psg for the gas wells under different pressure conditions:

$$P_{SG} = \frac{pM}{ZRT},$$

where Psg is gas density, kg/m³; P is pressure, MPa; M is relative molecular mass of natural gas, g/mol; T is temperature, K; R is ideal gas constant, 0.008314 atm-m$^3$/(kmol-K); and Z is deviation factor, dimensionless;

S12: calculating superficial gas velocity $V_{SG}$ of the gas wells: $V_{SG}$=QscPsc where Qsc is gas production, m$^3$/d; Psg is atmospheric gas density, kg/m$^3$; and A is a cross-sectional area of a pipe, m2;

S13: calculating superficial liquid velocity $V_{SL}$ of the gas wells: $VS_L$=QsI/A, where $Qs_L$ is liquid production of the gas well, m$^3$/d;

S2: configuring the superficial liquid velocity of the experimental apparatus to match the superficial liquid velocity of a target gas well of the gas wells in the study area, wherein the experimental apparatus comprises at least a pressure gauge, a flowmeter, a test pipe section with an inlet at a bottom portion and an outlet at a top end, a pneumatic valve in the test pipe section, an outlet pressure control valve, and an electric valve, S21: calibrating the pressure gauge and the flow meter to ensure that the pneumatic valve, the outlet pressure control valve and the electric valve are in good condition;

S22: fully opening the outlet pressure control valve ensuring that the experiment is carried out under low pressure conditions;

S23: adjusting a gas-liquid flow rate of the experimental apparatus to ensure that the gas-liquid flow rate of the experimental apparatus matches a gas-liquid flow rate of the target gas well, observing gas-liquid flow patterns after flow is stable, then closing the pneumatic valve, and using a liquid level height observed in the test pipe section to determine a liquid holdup $H_L$; the calculation formula for liquid holdup being: HL=Hmea/Htotal, where Hmea is a distance from the pneumatic valve to the liquid level height; and $H_{total}$ is a distance from the pneumatic valve to the outlet;

S24: gradually increasing a superficial gas velocity in the experimental apparatus, a step length Δv being set as 1 m/s, repeating step S23, recording the liquid holdup of the wellbore at different gas flow rates under the low pressure condition, and plotting a curve of the liquid holdup varying along with the superficial gas velocity;

S25: adjusting the outlet pressure control valve until a medium pressure condition is reached which is greater than the low pressure condition, repeating steps S23 and S24 at the medium pressure condition S3: according to liquid holdup data of the wellbore under low pressure and medium pressure conditions obtained in steps S2-S25 constructing a similarity criterion to characterize a flow similarity of gas-liquid two-phase flow under different pressures;

S4: calculating the similarity criterion using the density and the superficial gas velocity value of the high-pressure gas well calculated in steps S11 and S12, using the similarity criterion to calculate a corresponding superficial gas velocity value under the low pressure, and repeating steps S21-S24 at the low pressure condition and observing corresponding flow patterns which will be representative of flow patterns of the target gas well.

2. The method for determining flow patterns of a wellbore of a vertical gas well under high pressure conditions using an experimental apparatus at a facility according to claim 1, wherein in step S3, the method for constructing a similarity criterion to characterize a flow similarity of gas-liquid two-phase flow under different pressures is:

given different values of n and a, according to the experimental test results of liquid holdup varying along with gas flow rate under low pressure and medium pressure conditions, drawing the coordinate curve of liquid holdup varying along with the similarity criterion $_{PSG}V^{n(1-aHL)}$, n and a representing fitting coefficients; obtaining the n and a values which characterize the flow similarity when the curves of the liquid holdup of the wellbore coincide with the similarity criterion under the conditions of low pressure and medium pressure.

* * * * *